US012559118B2

(12) United States Patent
Charugundla Gangadhar

(10) Patent No.: US 12,559,118 B2
(45) Date of Patent: Feb. 24, 2026

(54) VEHICULAR CONTROL SYSTEM WITH DETECTION AND PREVENTION OF UNINTENDED MOTION

(71) Applicant: Magna Electronics Inc., Auburn Hills, MI (US)

(72) Inventor: Sai Sunil Charugundla Gangadhar, Rochester Hills, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 463 days.

(21) Appl. No.: 17/304,967

(22) Filed: Jun. 29, 2021

(65) Prior Publication Data

US 2021/0403020 A1     Dec. 30, 2021

Related U.S. Application Data

(60) Provisional application No. 62/705,460, filed on Jun. 29, 2020.

(51) Int. Cl.
| | |
|---|---|
| *B60W 40/105* | (2012.01) |
| *B60R 16/023* | (2006.01) |
| *B60W 10/18* | (2012.01) |
| *B60W 50/14* | (2020.01) |
| *G06V 20/56* | (2022.01) |
| *H04L 12/40* | (2006.01) |

(52) U.S. Cl.
CPC .......... *B60W 50/14* (2013.01); *B60R 16/023* (2013.01); *B60W 10/18* (2013.01); *B60W 40/105* (2013.01); *G06V 20/56* (2022.01); *H04L 12/40* (2013.01); *B60W 2050/143*

(2013.01); *B60W 2050/146* (2013.01); *B60W 2420/403* (2013.01); *B60W 2520/04* (2013.01); *B60W 2540/10* (2013.01); *B60W 2540/12* (2013.01); *H04L 2012/40215* (2013.01); *H04L 2012/40273* (2013.01)

(58) Field of Classification Search
CPC ...... B60W 40/105; B60W 10/18; G06V 20/56
See application file for complete search history.

(56) References Cited

U.S. PATENT DOCUMENTS

| | | | |
|---|---|---|---|
| 5,161,107 | A | 11/1992 | Mayeaux et al. |
| 5,550,677 | A | 8/1996 | Schofield et al. |
| 5,670,935 | A | 9/1997 | Schofield et al. |
| 5,949,331 | A | 9/1999 | Schofield et al. |
| 6,463,900 | B1 | 10/2002 | Wakabayashi et al. |

(Continued)

*Primary Examiner* — Benyam Haile
(74) *Attorney, Agent, or Firm* — HONIGMAN LLP

(57) ABSTRACT

A vehicular driver assist system includes a camera disposed at a vehicle and an electronic control unit (ECU) having an image processor for processing image data captured by the camera. Responsive to processing by the image processor of captured image data, the ECU detects an object in the vicinity of the vehicle. The ECU, responsive to detecting the object, determines movement of the detected object relative to the vehicle. The ECU, responsive to determining movement of the detected object relative to the vehicle, determines a current driving condition of the vehicle. The ECU compares the current driving condition to a current actual speed of the vehicle and determines whether or not the vehicle is moving unintentionally. Responsive to determining that the vehicle is moving unintentionally, the system slows the vehicle or generates an alert to a driver of the vehicle.

17 Claims, 3 Drawing Sheets

Camera keeps monitoring the front and rear scenes of
the vehicle to detect unintended motion Once detected, command to prevent unintended vehicle motion
will be provided on vehicle bus

(56) References Cited

U.S. PATENT DOCUMENTS

| | | |
|---|---|---|
| 6,516,262 B2 | 2/2003 | Takenaga et al. |
| 6,629,515 B1 | 10/2003 | Yamamoto et al. |
| 6,690,268 B2 | 2/2004 | Schofield et al. |
| 6,693,517 B2 | 2/2004 | McCarthy et al. |
| 6,728,623 B2 | 4/2004 | Takenaga et al. |
| 7,038,577 B2 | 5/2006 | Pawlicki et al. |
| 7,398,076 B2 | 7/2008 | Kubota et al. |
| 7,580,795 B2 | 8/2009 | McCarthy et al. |
| 7,676,324 B2 | 3/2010 | Bae |
| 7,698,053 B2 | 4/2010 | Mori |
| 7,720,580 B2 | 5/2010 | Higgins-Luthman |
| 7,853,401 B2 | 12/2010 | Hoetzer |
| 7,855,755 B2 | 12/2010 | Weller et al. |
| 8,031,062 B2 | 10/2011 | Smith |
| 8,078,379 B2 | 12/2011 | Lu |
| 8,296,030 B2 | 10/2012 | Luo et al. |
| 8,532,843 B2 | 9/2013 | Nagura et al. |
| 8,594,912 B2 | 11/2013 | Weaver |
| 8,606,455 B2 | 12/2013 | Boehringer et al. |
| 8,694,192 B2 | 4/2014 | Cullinane |
| 9,092,986 B2 | 7/2015 | Salomonsson et al. |
| 9,318,020 B2 | 4/2016 | Salomonsson et al. |
| 9,346,401 B2 | 5/2016 | Reichel et al. |
| 9,409,567 B2 | 8/2016 | Otake |
| 9,563,809 B2 | 2/2017 | Salomonsson et al. |
| 9,824,285 B2 | 11/2017 | Salomonsson et al. |
| 9,926,881 B2 | 3/2018 | Sangameswaran et al. |
| 10,071,687 B2 | 9/2018 | Ihlenburg et al. |
| 10,099,614 B2 | 10/2018 | Diessner |
| 10,190,560 B2 | 1/2019 | Tedesco et al. |
| 10,731,618 B2 | 8/2020 | Tedesco et al. |
| 11,125,198 B2 | 9/2021 | Tedesco et al. |
| 2004/0221790 A1* | 11/2004 | Sinclair ..................... G01P 3/36 |
| | | 356/4.03 |
| 2010/0070172 A1 | 3/2010 | Kumar |
| 2010/0125402 A1 | 5/2010 | Bansal et al. |
| 2010/0168992 A1 | 7/2010 | Nakata |
| 2010/0211247 A1* | 8/2010 | Sherony .............. B60W 40/076 |
| | | 701/1 |
| 2010/0292886 A1 | 11/2010 | Szczerba et al. |
| 2011/0005486 A1 | 1/2011 | Nakamura |
| 2012/0062743 A1 | 3/2012 | Lynam et al. |
| 2012/0116632 A1 | 5/2012 | Bechtel et al. |
| 2012/0218412 A1 | 8/2012 | Dellantoni et al. |
| 2012/0277947 A1 | 11/2012 | Boehringer et al. |
| 2013/0116915 A1 | 5/2013 | Ferreira et al. |
| 2013/0222592 A1 | 8/2013 | Gieseke |
| 2014/0218529 A1 | 8/2014 | Mahmoud et al. |
| 2014/0277901 A1 | 9/2014 | Ferguson et al. |
| 2014/0375476 A1 | 12/2014 | Johnson et al. |
| 2015/0124096 A1 | 5/2015 | Koravadi |
| 2015/0158499 A1 | 6/2015 | Koravadi |
| 2015/0251599 A1 | 9/2015 | Koravadi |
| 2015/0284008 A1 | 10/2015 | Tan et al. |
| 2015/0352953 A1 | 12/2015 | Koravadi |
| 2016/0036917 A1 | 2/2016 | Koravadi et al. |
| 2016/0210853 A1 | 7/2016 | Koravadi |
| 2017/0057505 A1* | 3/2017 | Woodley .............. B60W 10/06 |
| 2019/0291726 A1* | 9/2019 | Shalev-Shwartz .... B60W 10/06 |
| 2022/0207885 A1* | 6/2022 | Ansari ................. H04L 9/3247 |

* cited by examiner

Camera keeps monitoring the front and rear scenes of the vehicle to detect unintended motion Once detected, command to prevent unintended vehicle motion will be provided on vehicle bus

VEHICULAR CONTROL SYSTEM WITH DETECTION AND PREVENTION OF UNINTENDED MOTION

CROSS REFERENCE TO RELATED APPLICATION

The present application claims the filing benefits of U.S. provisional application Ser. No. 62/705,460, filed Jun. 29, 2020, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

Implementations herein provide a driving assistance system or vision system or imaging system for a vehicle that utilizes one or more cameras (preferably one or more CMOS cameras) to capture image data representative of images exterior of the vehicle, and provides an electronic control unit (ECU) including electronic circuitry and associated software. The electronic circuitry of the ECU includes an image processor for processing image data captured by the camera to detect presence of objects viewed by the camera. The ECU, responsive to processing by the image processor of image data captured by the camera, detects at least one object in the vicinity of the vehicle and the ECU, responsive to detecting the at least one object, determines movement of the at least one detected object. The ECU, responsive to determining movement of the at least one detected object, determines a current driving condition of the vehicle. ECU compares the current driving condition of the vehicle to a current actual speed of the vehicle to determine if the vehicle is moving unintentionally. The ECU, responsive to determining that the vehicle is moving unintentionally, slows the vehicle or generates an alert to a driver of the vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
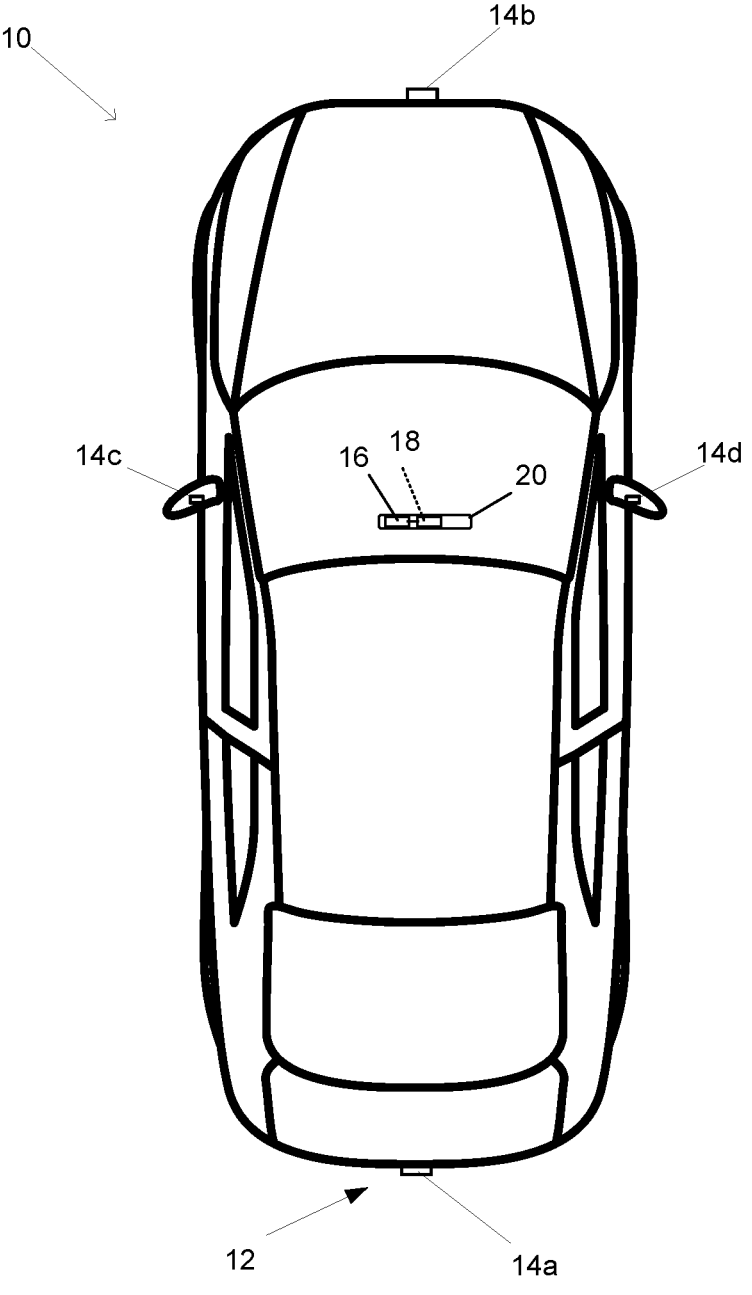
FIG. 1 is a plan view of a vehicle with a vision system that incorporates cameras.

Referring now to the drawings and the illustrative embodiments depicted therein, a vehicle 10 includes an imaging system or vision system or driver assist system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The driving assist system, based on processing of image data captured by the camera(s) 14, detects and recognizes scene behavior around the vehicle. Based on the scene and other vehicle inputs, the system determines when the vehicle is undergoing unintentional movement or motion (e.g., the vehicle is rolling forward or backward unintentionally). For example, when the vehicle is in gear and stopped due to pressure applied to the brakes, when brake pressure is unintentionally released, the vehicle may begin rolling forward or rolling backward (e.g., when on a hill or slight incline or when the engine's idle speed causes the vehicle to move forward when the brakes are released). The system may automatically halt the unintended motion (e.g., via applying the brakes or parking brake of the vehicle) and/or notify an operator of the vehicle (e.g., via an audible alert, haptic feedback, and/or via a visual alert or display).

Figure 2:
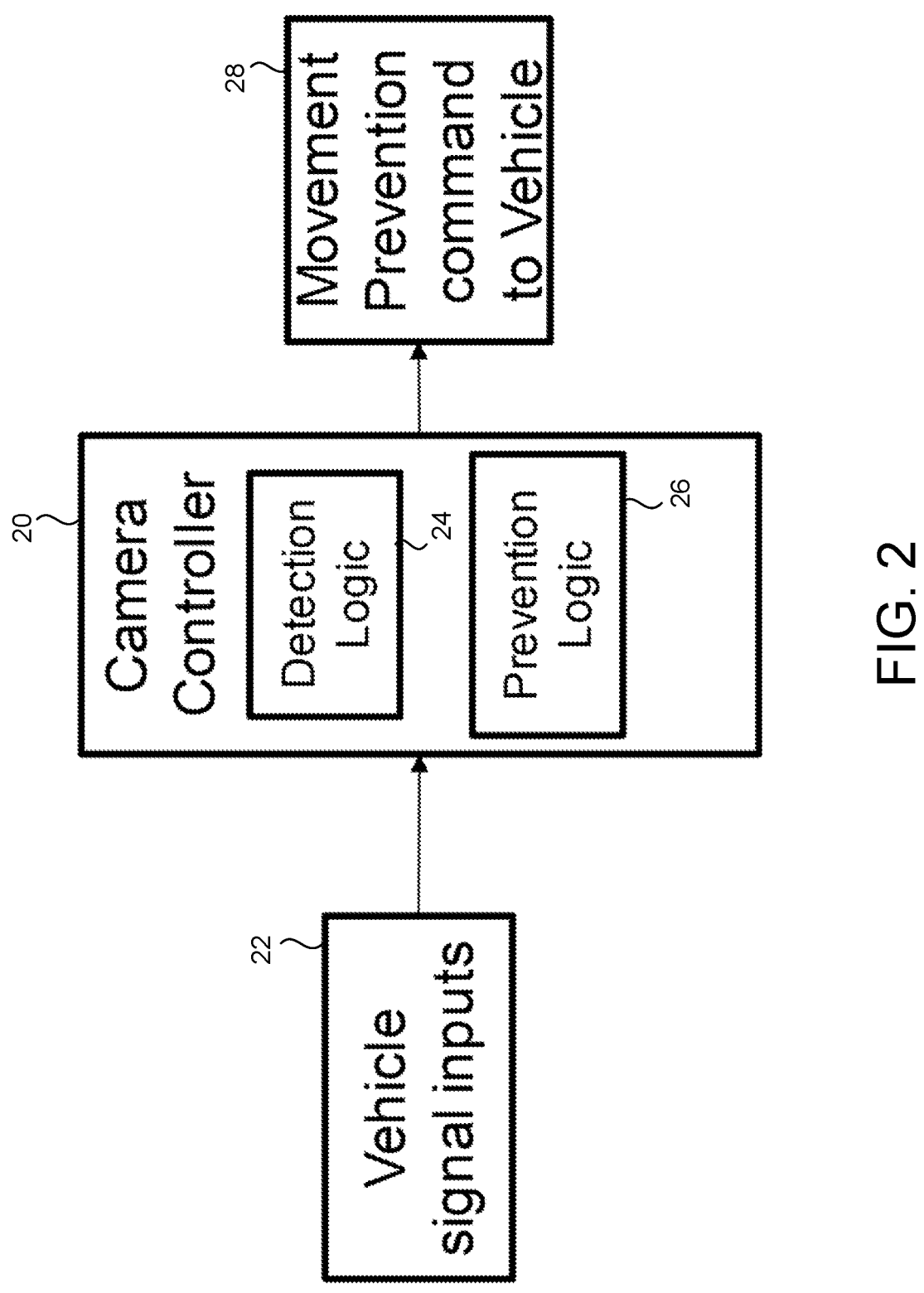
FIG. 2 is a schematic view of a driver assist system.

Referring now to FIG. 2, the system includes a camera controller or electronic control unit 20. The camera controller 20 receives various vehicle signal inputs 22. These vehicle inputs 22 may include, for example, image data from one or more cameras 14, a speed of the vehicle (e.g., from a speed sensor), an acceleration of the vehicle (e.g., from an accelerometer), steering wheel angle, and/or pedal positions of the accelerator pedal and/or the brake pedal. The system may take into account the current grade of the surface the vehicle is on (e.g., via map data stored at the vehicle and a GPS system). The camera controller 20 includes detection logic 24 for detecting unintentional movement (such as rolling forward or backward) by the vehicle and prevention logic 26 for preventing or halting the unintentional movement. The camera controller 20, responsive to detecting unintentional movement, transmits a movement prevention command 28 to the vehicle (e.g., to an electronic control unit (ECU) of the vehicle). The ECU, upon receiving the movement prevention command 28, make take appropriate action to halt the unintentional movement such as by applying the brakes, applying the parking brake, and/or providing an alert to the occupants of the vehicle.

Figure 3:
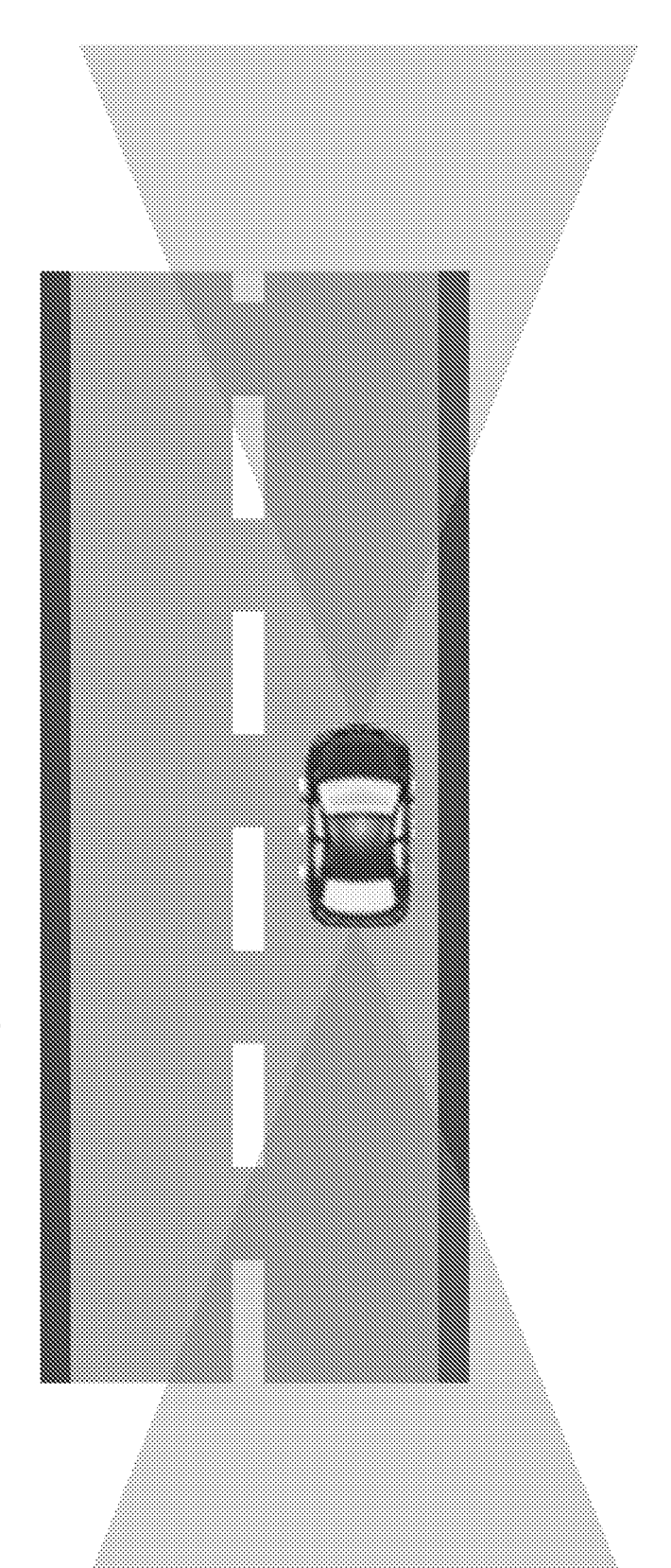
FIG. 3 is a schematic view of a vehicle monitoring a scene surrounding the vehicle to determine unintentional movement of the vehicle.

As shown in FIG. 3, the camera 14 (or other imaging sensor such as radar, LIDAR, etc.) may monitor the scene and imagery both in front of and behind the vehicle and the system may determine unintentional forward movement and/or unintentional rearward movement. For example, when a driver neglects to place a vehicle in park on a hill and releases his or her foot from the brake, the vehicle may begin unintentionally moving. The system may detect this unintentional movement based at least in part on processing image data captured by one or more cameras and may halt the determined unintentional movement by applying the brakes of the vehicle.

The system may determine the unintended or unintentional movement based on a driving condition of the vehicle. The driving condition may include any situation and/or location of the vehicle that defines an expectation of the vehicle such as an expected speed of the vehicle, an expected yaw of the vehicle, an accelerator pedal position signal from the vehicle, a location of the vehicle, and/or expectations obtained via scene information captured by the camera (e.g., at a red light or a stop sign). The system may compare the driving condition to actual conditions of the vehicle (e.g., compare the vehicle's expected speed to the vehicle's actual speed, the vehicle's location, etc.). Optionally, the system estimates the speed and the yaw of the vehicle based on scene detection determined from image data captured by the camera(s). For example, the ECU may process image data captured by the cameras 14 or other image sensors to detect one or more objects or features. The detected objects (e.g., traffic lanes or lane markers, other vehicles, traffic signs, and signals, etc.) may be used to detect and determine the scene around the vehicle. The system may determine a rate of change of positions of the detected objects (e.g., in pixels) within the captured image data to create a speed estimation model using optical properties of the camera. That is, the system may detect movement by determining a change in location of one or more objects in the image data captured by one or more cameras. Based on this movement or rate of change, the system may estimate a current speed of the vehicle. When the estimated current speed of vehicle based on scene information is greater than an expected speed of the vehicle (e.g., an expected speed received via a CAN bus from the vehicle ECU or from an accelerator pedal position), the system may determine that the movement is unintentional. For example, the system may estimate (via processing of image data captured by the camera or cameras) that the vehicle is moving at 2 miles per hour but the accelerator pedal position indicates that the operator is not pressing the accelerator (i.e., the accelerator pedal position is at a zero percent applied position) and the speed and/or yaw of the vehicle is indicative of the vehicle being close to a standing position. In this scenario, the system may determine that the vehicle is moving unintentionally and command the vehicle apply braking (e.g., light braking).

The system may determine the expected speed using any number of techniques. For example, the system may determine the expected vehicle speed or driving condition from a wheel speed sensor, from GPS data (e.g., the ECU may receive a signal indicative of the vehicle speed as provided by the wheel speed sensor or a global positioning system), or via image processing of image data captured by the camera(s) (e.g., the ECU may determine a driving condition or situation (such as an intersection with a stop sign or stop light) and determine the expected vehicle speed for that condition or situation. For example, the system may determine, via the processed image data or GPS data, that the vehicle is at a stop sign or a stop light or other scenario where it is expected the vehicle should be stopped, whereby the expected speed of the vehicle would be zero mph (stopped).

Optionally, the system may include a threshold estimated speed that must be satisfied in order for the system to determine that the movement is unintentional. The threshold estimated speed may be relative based on the idle speed of the vehicle. For example, when the vehicle is moving faster than the vehicle idle speed (with the accelerator pedal position at zero) the system may determine the movement is unintentional. Similarly, the system may also determine that movement slower than the vehicle idle speed (when the brake pedal position is at zero) is unintentional movement. When the threshold speed is not satisfied, the system may determine that the movement is intentional. Optionally, the system may warn or otherwise notify an operator of the vehicle prior to applying the brakes. In some examples, the system considers a current or recent history of the positions of the brake and/or acceleration pedals. For example, when the brake pedal is slowly released, the system may determine that forward movement is intentional. Optionally, the system determines that the vehicle travelling at idle speed is unintentional. The system may use other data, such as sensor data (e.g., from an ultrasonic sensor, a camera, radar, GPS, etc.) or from previous positions of the brake and/or accelerator.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347468; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driver assist system, the vehicular driver assist system comprising:

a camera disposed at a windshield of a vehicle equipped with the vehicular driver assist system and viewing through the windshield and exterior of the vehicle, the camera capturing image data;

an electronic control unit (ECU) comprising electronic circuitry and associated software;

wherein the electronic circuitry of the ECU comprises an image processor for processing image data captured by the camera to detect presence of an object viewed by the camera;

wherein the ECU, responsive to processing by the image processor of image data captured by the camera, detects the object viewed by the camera;

wherein the ECU, responsive to detecting the object and via processing subsequent image data captured by the camera, determines movement of the detected object relative to the vehicle;

wherein the ECU estimates a current speed of the vehicle based at least in part on the determined movement of the detected object relative to the vehicle;

wherein the ECU, responsive to estimating the current speed of the vehicle based at least in part on the determined movement of the detected object relative to the vehicle, determines (i) a current driving condition of the vehicle and (ii) a current expected speed of the vehicle associated with the determined current driving condition of the vehicle;

wherein the ECU, responsive to determining that the current expected speed of the vehicle associated with the determined current driving condition of the vehicle is zero mph, and responsive to determining that the estimated current speed of the vehicle is greater than zero mph, slows the vehicle or generates an alert to a driver of the vehicle;

wherein the ECU determines that the current estimated speed of the vehicle satisfies a speed threshold; and wherein the speed threshold is based on an idle speed of the vehicle.

2. The vehicular driver assist system of claim 1, wherein the ECU receives a signal indicative of the current driving condition of the vehicle via a CAN bus.

3. The vehicular driver assist system of claim 1, wherein the current driving condition of the vehicle is based at least in part on a position of at least one selected from the group consisting of (i) the accelerator pedal of the vehicle and (ii) the brake pedal of the vehicle.

4. The vehicular driver assist system of claim 1, wherein the current driving condition of the vehicle is based at least in part on image processing of image data captured by the camera.

5. The vehicular driver assist system of claim 4, wherein the current driving condition of the vehicle is determined to be zero mph responsive to determination, via image processing of image data captured by the camera, that the vehicle is at a stop sign or red traffic light.

6. The vehicular driver assist system of claim 1, wherein the ECU determines that the vehicle is moving in a forward direction unintentionally.

7. The vehicular driver assist system of claim 1, wherein the ECU determines that the vehicle is moving in a rearward direction unintentionally.

8. The vehicular driver assist system of claim 1, wherein the ECU determines a rate of change of the detected object in pixels of the captured image data.

9. The vehicular driver assist system of claim 1, wherein the ECU generates an alert to the driver of the vehicle of unintentional movement of the vehicle.

10. The vehicular driver assist system of claim 9, wherein the ECU generates the alert to the driver via a display disposed within the vehicle.

11. The vehicular driver assist system of claim 9, wherein the ECU generates the alert to the driver via an audible alert.

12. The vehicular driver assist system of claim 1, wherein the ECU slows the vehicle by applying a brake of the vehicle.

13. A vehicular driver assist system, the vehicular driver assist system comprising:

a camera disposed at a windshield of a vehicle equipped with the vehicular driver assist system and viewing through the windshield and exterior of the vehicle, the camera capturing image data;

an electronic control unit (ECU) comprising electronic circuitry and associated software;

wherein the electronic circuitry of the ECU comprises an image processor for processing image data captured by the camera to detect presence of an object viewed by the camera;

wherein the ECU, responsive to processing by the image processor of image data captured by the camera, detects the object viewed by the camera;

wherein the ECU, responsive to detecting the object and via processing subsequent image data captured by the camera, determines movement of the detected object relative to the vehicle;

wherein the ECU estimates a current speed of the vehicle based at least in part on the determined movement of the detected object relative to the vehicle;

wherein the ECU, responsive to estimating the current speed of the vehicle based at least in part on the determined movement of the detected object relative to the vehicle, determines (a) a current driving condition of the vehicle and (b) a current expected speed of the vehicle associated with the determined current driving condition of the vehicle;

wherein the current driving condition of the vehicle is based at least in part on a position of at least one selected from the group consisting of (i) the accelerator pedal of the vehicle and (ii) the brake pedal of the vehicle, and wherein the current driving condition of the vehicle is based at least in part on image processing of image data captured by the camera;

wherein the ECU, responsive to determining that the current expected speed of the vehicle associated with the determined current driving condition of the vehicle is zero mph, and responsive to determining that the estimated current speed of the vehicle is greater than zero mph, slows the vehicle or generates an alert to a driver of the vehicle;

wherein the ECU determines that the current estimated speed of the vehicle satisfies a speed threshold; and wherein the speed threshold is based on an idle speed of the vehicle.

14. The vehicular driver assist system of claim 13, wherein the current expected speed of the vehicle associated with the current driving condition of the vehicle is determined to be zero mph responsive to determination, via image processing of image data captured by the camera, that the vehicle is at a stop sign or red traffic light.

15. The vehicular driver assist system of claim 14, wherein the ECU determines that the vehicle is moving in a forward direction unintentionally.

16. The vehicular driver assist system of claim 14, wherein the ECU determines a rate of change of the detected object in pixels of the captured image data.

17. A vehicular driver assist system, the vehicular driver assist system comprising:

a camera disposed at a windshield of a vehicle equipped with the vehicular driver assist system and viewing through the windshield and exterior of the vehicle, the camera capturing image data;

an electronic control unit (ECU) comprising electronic circuitry and associated software;

wherein the electronic circuitry of the ECU comprises an image processor for processing image data captured by the camera to detect presence of an object viewed by the camera;

wherein the ECU, responsive to processing by the image processor of image data captured by the camera, detects the object viewed by the camera;

wherein the ECU, responsive to detecting the object and via processing subsequent image data captured by the camera, determines movement of the detected object relative to the vehicle;

wherein the ECU estimates a current speed of the vehicle based at least in part on the determined movement of the detected object relative to the vehicle;

wherein the ECU, responsive to estimating the current speed of the vehicle based at least in part on the determined movement of the detected object relative to the vehicle, determines (i) a current driving condition of the vehicle and (ii) a current expected speed of the vehicle associated with the determined current driving condition of the vehicle;

wherein the ECU, responsive to determining that the current expected speed of the vehicle associated with the determined current driving condition of the vehicle is zero mph, and responsive to determining that estimated current speed of the vehicle is greater than zero mph, determines that the vehicle is moving in a rearward direction unintentionally;

wherein the ECU, responsive to determining that the vehicle is moving in the rearward direction unintentionally, generates an alert to a driver of the vehicle;

wherein the ECU that the vehicle is moving in the rearward direction unintentionally at least in part based on whether the current estimated speed of the vehicle satisfies a speed threshold; and wherein the speed threshold is based on an idle speed of the vehicle.

* * * * *